United States Patent [19]

Coutts

[11] Patent Number: 4,755,203
[45] Date of Patent: Jul. 5, 1988

[54] OPTIC FIBER POSITIONING FOR LENSING METHOD

[75] Inventor: Bruce Coutts, Costa Mesa, Calif.

[73] Assignee: ITT Corporation, New York, N.Y.

[21] Appl. No.: 2,884

[22] Filed: Jan. 13, 1987

[51] Int. Cl.$^4$ ............... C03B 37/075; C03B 23/09; G02B 6/00
[52] U.S. Cl. ............... 65/2; 65/10.2; 65/11.1; 65/36; 65/40; 219/121.25; 219/121.27; 219/121.31; 264/1.4; 350/96.18; 373/2; 373/24 373/24
[58] Field of Search ............... 65/2, 10.2, 11.1, 37, 65/40, 36; 264/1.4, 2.7; 350/96.18; 373/2, 3, 4, 22, 23, 24; 219/121 EB, 121 EF, 121 EG, 121 ER, 121 ES, 121 ET, 121 EX

[56] References Cited

U.S. PATENT DOCUMENTS 4,243,399  1/1981  Khoe et al. ............... 65/37 X
4,345,930  8/1982  Basola et al. ............... 264/2.7 X

FOREIGN PATENT DOCUMENTS 56-25703   3/1981  Japan ............... 65/10.2
58-102911  6/1983  Japan .
59-7303    1/1984  Japan ............... 65/10.2

Primary Examiner—Robert L. Lindsay
Attorney, Agent, or Firm—T. L. Peterson

[57] ABSTRACT

A system is described for forming a lens at the end of an optical fiber which extends through a hole in a contact, so the tip of the lens lies at a desired lens position located a predetermined distance rearward of the tip of the contact. The fiber is fixed to the contact at a position wherein the tip of the fiber lies forward of the desired lens position, at about the tip of the contact. The contact is positioned vertically, with the tip of the fiber pointing upwardly, and an arc is passed across the end portion of the fiber, to initially heat and bulge out a location on the fiber spaced rearward of the tip. As the fiber is heated, the tip portion falls into the bulging portion, while the bulging portion moves down, with the heating continued long enough so that the tip of the molten ball of glass lies at the desired lens position.

8 Claims, 2 Drawing Sheets

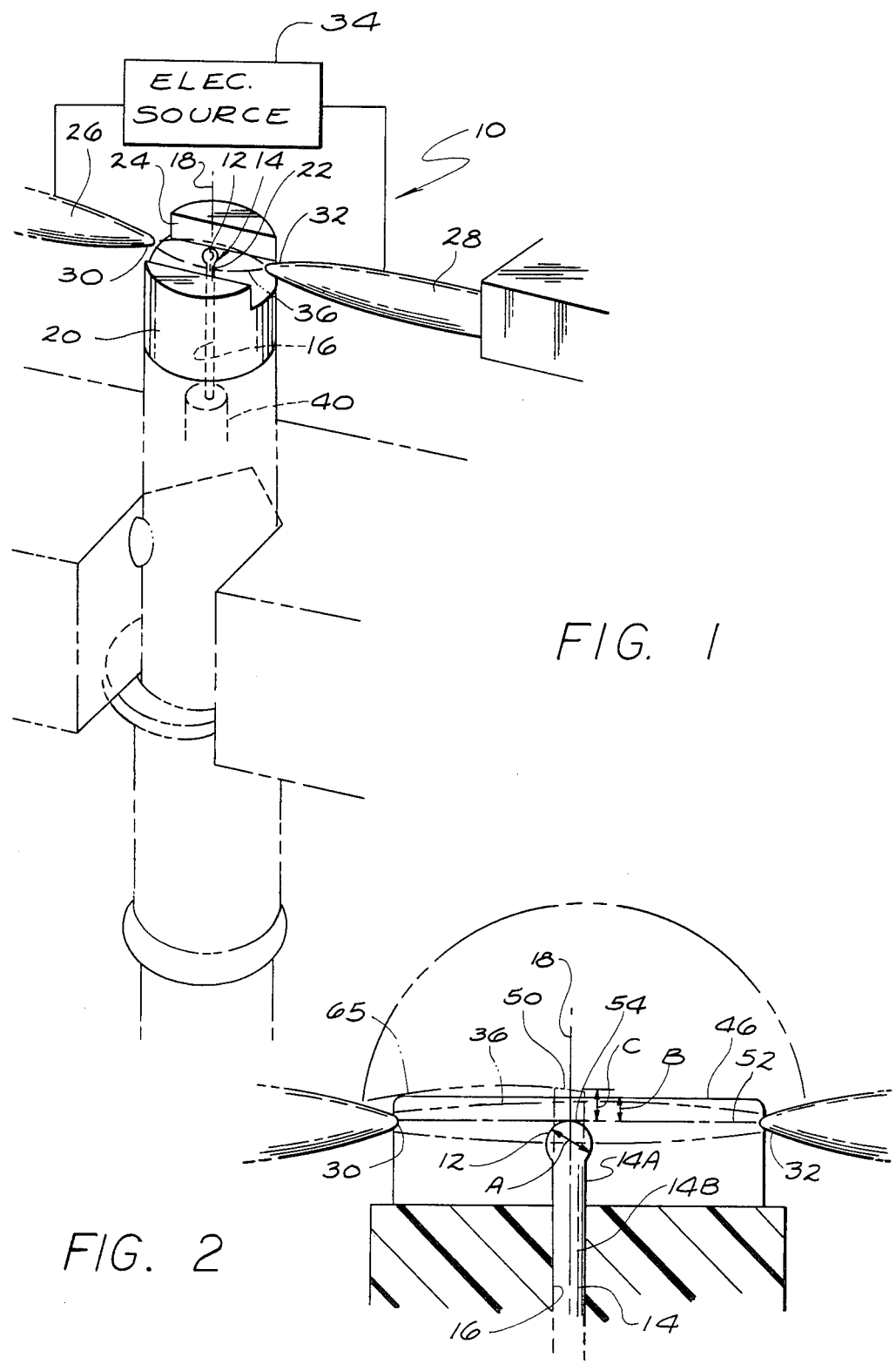

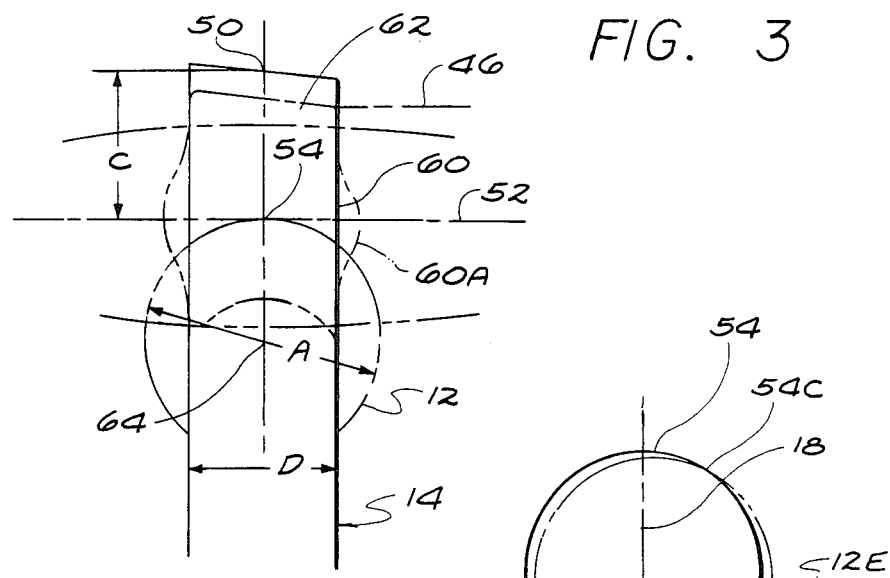
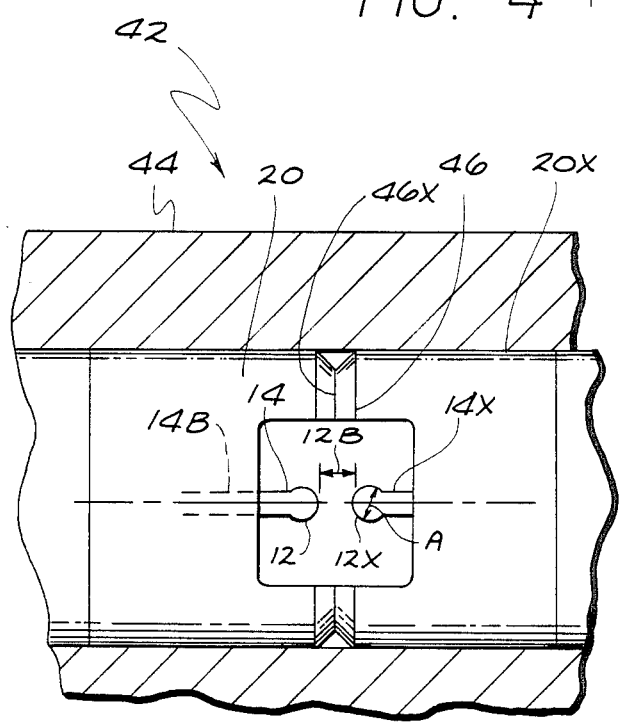

4,755,203

OPTIC FIBER POSITIONING FOR LENSING METHOD

BACKGROUND OF THE INVENTION

One method for coupling a pair of optic fibers, to pass a high proportion of light from one to the other, is to melt the ends of the fibers into beads or lenses, and to hold the lenses a predetermined small distance apart and in alignment. When a lens is formed at the end of a fiber, an interface between the lens and the rest of the fiber is formed, which is weaker than the rest of the fiber. To avoid breaking off the lens through handling of it, it is often desirable to first fix the fiber in place on a contact, and to then form the lens on the fiber so the lens ends up at its final position. Whether or not the lens is formed when it is fixed to the contact, the lens must be formed with a rounded forward portion having a predictable radius of curvature and being symmetrical about the axis of that portion of the optic fiber lying just behind the lens where the fiber will be held. A method and apparatus which facilitated a predictable formation of such lenses, especially when held in a contact, would be of considerable value.

SUMMARY OF THE INVENTION

In accordance with one embodiment of the present invention, a method and apparatus are provided for forming a lens at the end of an optical fiber. The fiber can be held stationary with respect to the tips of a pair of electrodes, with an imaginary line connecting the electrode tips extending substantially through the fiber, at a fiber location rearward of the extreme forward end or tip of the fiber. The fiber can be oriented vertically, preferably with its tip pointing upwardly. An arc formed between the electrode tips produces a molten enlarged fiber portion behind the fiber tip. The arc continues while the tip is drawn inwardly into the molten sphere and while the molten sphere slowly moves down. Heating continues just long enough that when the molten sphere hardens into a lens, the center of the lens lies behind the imaginary line connecting the tips of the electrodes, and preferably with the tip of the lens lying about even with the imaginary line. An optic fiber on which a lens is to be formed, is fixed to a contact at a position wherein the tip of the fiber lies about even with the contact.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view illustrating a method and apparatus of the present invention, showing a lens formed on an optic fiber fixed in a contact.

FIG. 2 is an enlarged sectional view of a portion of the apparatus of FIG. 1.

FIG. 3 is an enlarged view of a portion of the apparatus of FIG. 2, showing the front end portion of the optic fiber during its melting into a lens.

FIG. 4 is a side elevation view of a portion of the optic fiber of FIG. 3.

FIG. 5 is a sectional side view of a connection system showing how a pair of optic fibers modified in accordance with the invention are coupled.

DESCRIPTION OF THE PREFERRED EMBODIMENTS

FIG. 1 illustrates an apparatus 10 which can form a lens 12 at the end of an optical fiber 14. The optical fiber lies in a longitudinal hole 16 extending along the axis 18 of an elongated largely cylindrical contact 20. The fiber includes a forward end portion 22 which lies in a cross-aperture 24 of the contact which extends largely perpendicular to the hole 16. A pair of electrodes 26, 28 are positioned with their tips 30, 32 at opposite sides of the cross-aperture. When electricity from a source 34 is applied to the electrodes, an arc 36 is established between the electrode tips, which melts the end of the optical fiber to form the lens 12. The optical fiber is part of a fiber assembly 40 which is fixed to the contact prior to forming the lens. The optic fiber 14 is projected through the hole 16 in the contact until its tip has passed at least partially through the cross-aperture, and then the fiber assembly is fixed in place. After the lens is formed, it lies in a position for coupling to a lensed optical fiber of another contact.

FIG. 5 illustrates a coupling 42 wherein a pair of contacts 20, 20X each hold an optic fiber 14, 14X that each have a lens 12, 12X thereon. The two contacts are placed in a coupling member or holder 44 with the front ends or tips 46, 46X of the two contacts abutting. With the lenses of a predetermined diameter A and spaced apart by a predetermined spacing 2B, light is efficiently coupled between the optic fibers.

FIG. 2 illustrates the optic fiber 14 both before and after its end portion 14A is formed into a lens. The fiber is initially positioned so its extreme front end or tip 50 lies approximately even with the tip 46 of the contact. Specifically, the tip 50 lies a distance C forward of an imaginary substantially horizontal line 52 which extends between the tips 30, 32 of the electrodes. When a current is passed between the electrodes, the resulting arc, whose bright visible portion is indicated at 36, melts a portion of the optic fiber. The molten portion assumes the form of a ball, which hardens into a lens 12 at the end of the optic fiber. Since the optic fiber is fixed in position in the contact, the lens is not thereafter moved relative to the contact so there is little danger of damage to the lens. For reliable optic coupling, this requires that the lens end up so it has a desired diameter A, and that the tip of the lens lie at a preferred lens tip position spaced a predetermined distance B behind the forward end or tip of the contact. Also, the lens must lie symmetric with the axis 18 of the fiber, particularly the portion of the fiber that lies in the elongated hole 16, and the front end of the lens must have approximately a predetermined radius of curvature.

FIG. 3 illustrates the optic fiber during three stages of its formation. Initially, the optic fiber at 14 is positioned with its tip 50 a distance C forward of the imaginary line 52 connecting the electrode tips. The optic fiber has a diameter D, and the projection distance C approximately equals the fiber diameter D. The fiber preferably extends vertically, and preferably with its tip 50 facing upwardly, for the reasons described below. The arc applies the greatest heat near the imaginary line 52. The location 60 along the fiber near this line 52 is the first portion to become molten. This portion can be seen to bulge outwardly to the position 60A, while portions of the fiber above and below the location at 60A do not yet bulge. A tip portion 62 of the fiber moves downwardly as the bulge 60A forms, and the bulging portion at 60A increases in diameter as it moves downwardly, and as the tip portion 62 moves downwardly even faster to form a molten sphere at the end of the optical fiber. The arc is continued for a sufficient period of time, that the molten ball grows and falls to a position where the center 64 of the ball lies a distance below the imaginary tip-connecting line 52. At that time, and with the tip 54 of the ball on the line 52, heating stops and the molten ball hardens into a spherical (along an angle of about 260° as seen in cross section) ball.

Various techniques have been designed for forming a lens at the end of an optical fiber. One technique involved locating the extreme forward tip of the fiber at about the center of the arc, and feeding the fiber forwardly to melt progressively greater amounts of the fiber until a ball of desired size is formed, which hardens into a lens. Since the most commonly used optic fibers have a diameter less than about 0.010 inch, it is difficult to closely control movement of the optic fiber at the proper rate and for the proper distance to form numerous lenses that are all of the same size, and preferably at a desired position relative to a contact. Attempts have been made to heat the end of the optic fiber while it lay horizontal, but it was found that considerable "droop" of the lens occurs, wherein the center of curvature of the front end of the lens is not concentric with the axis of the optic fiber. Applicant finds that by positioning the optic fiber vertically, with the tip 50 of the fiber pointing upwardly, a closely controlled and effective lens is formed. Although surface tension is probably the main factor in forming the molten end portion of the fiber into a lens, other factors have an influence, including viscosity and gravity. The presence of gravity can cause the tip portion at 54 of the lens to become slightly flattened, so that a spacing 2B of the lenses may be slightly greater for maximum light transmission. However, the use of lenses to couple optic fibers allows for some variation in the spacing distance 2B while still providing efficient coupling.

The optic fiber 14 should be maintained vertical within about 2° to 3°. As shown in FIG. 4, applicant has found that when the axis 18 of the optic fiber is angled by more than a few degrees away from the vertical, the formed lens displays a "droop" indicated at 12C, wherein the center of curvature of the tip portion at 54C of the lens is angled from the axis of the optic fiber portion 14B lying rearward of the lens. This rearward portion at 14B is closely held in the contact, in alignment with the axis of another optic fiber to be coupled to, and this alignment of the lens and the optic fiber portion 14B can result in poor optical coupling. It is possible to form the lens with the tip of the optical fiber pointing downwardly. However, excessive heating can then lead to a molten ball of low viscosity wherein gravity (urging the molten ball down) opposes surface tension (urging the ball up), and can lead to an elongated lens for optic fibers of larger diameter.

Applicant has constructed an optical contact assembly using optic fibers of a range of diameters of 125 um (micrometers) to 250 um. For 140 um fibers, the arc current was continued for a period of about 3 seconds, at an arc current of about 20 milliamperes (root mean square for an AC arc) with a fiber extending vertical within a cross-aperture 24 at the end of a contact. As shown, a lens of a diameter A of about 190 um was formed consistently on the fibers. The tips 50 of the optic fibers were initially positioned a distance C of about 0.005 inch above the desired position of the tip of the lens, by having the fiber abut a gage with a surface about 0.001 inch above the contact tip. An example of such a gage is indicated at 65. The lens tip lay at a final position a distance B of about 3.5 to 4 thousandths inch below the tip 46 of the contact.

Thus, the invention provides a method and apparatus for forming a lens at the end of an optical fiber, where the fiber may be fixed in a hole in a contact, which results in lenses of uniform shape, size, and position. A portion of the fiber rearward of the forward end is positioned stationary with respect to an imaginary line connecting the tips of electrodes, with the extreme forward or tip end of the fiber lying forward of the imaginary line, and preferably with the tip facing upwardly and lying vertically above the imaginary line. An arc between the electrodes initially melts a fiber location spaced rearwardly of the tip so that that location bulges, and the tip portion falls into the molten bulging portion as the molten bulging portion moves downwardly. The arc is maintained long enough so the molten ball or lens forms a largely spherical lens whose center lies rearward of the imaginary line, and preferably with the tip of the lens substantially on the imaginary line connecting the electrode tips. The tip of the optic fiber preferably lies forward of the desired position of the tip of the lens, by a distance about equal to the diameter of the fiber. The tip of the lens lies rearward of the tip of the contact, at a distance between about half the diameter of the optic fiber and the diameter of the optic fiber.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for forming a lens at the forward end of an optical fiber, where the lens has a greater diameter than the rest of the fiber, comprising:

positioning a forward end portion of an optical fiber between the pointed tips of a pair of electrodes, and establishing an electric arc which includes a visible arc portion between the electrode tips, at an arc current and duration which melts the forward end portion of the fiber to form it into a lens of largely spherical shape at the forward end of the rest of the optical fiber, while maintaining the electrodes and said optical fiber stationary with respect to each other;

said step of positioning including orienting said fiber so its axis is substantially vertical and locating the forward tip of the optic fiber forward of an imaginary line connecting the tips of said electrodes before establishing said arc and said step of establishing an arc includes continuing said arc to keep the fiber end portion molten until the center of said lens lies behind said imaginary line.

2. The method described in claim 1 wherein:

said step of establishing an arc includes initially melting a location on said fiber which lies behind the tip of said fiber, and allowing said tip to shift rearwardly into said melting location.

3. The method described in claim 2 wherein:

said step of positioning includes orienting said fiber vertically with its tip pointing upwardly, wherein said tip is urged by gravity into said melting location.

4. The method described in claim 1 wherein:

said step of positioning includes projecting said fiber through a longitudinal hole in an elongated contact, wherein the longitudinal hole extends along the length of the contact, until the tip of the fiber has passed at least partially through a cross-aperture in the contact, wherein the cross-aperture extends largely perpendicular to said longitudinal hole and lies near a forward end of the contact;

said first-mentioned contact is connectable to another similar contact so optic fibers in them can be efficiently coupled, when the optic fibers have lenses whose tips each lie at a preferred lens tip position spaced a predetermined distance behind the forward end of the contact;

said step of positioning includes positioning said contact so said imaginary line which connects the electrode tips passes substantially through said preferred lens tip position, and also includes fixing said optic fiber in said contact at a position wherein the tip of the optic fiber lies a distance forward of said preferred lens tip position which is substantially equal to the diameter of the optic fiber.

5. A method for forming an optical contact assembly from a contact and an optical fiber, comprising:

inserting said fiber through a longitudinal hole in the contact, until an extreme front tip of a front end portion of the fiber lies about even with an extreme front end of the contact;

maintaining said contact in an orientation wherein said fiber front end portion lies in a vertical orientation, while heating to a molten temperature said front end portion of said fiber, and allowing said molten portion to move vertically rearwardly and form a ball at the end of said fiber, at a location rearward of said extreme front end of said contact.

6. The method described in claim 5 wherein:

said tip of said fiber faces upwardly, and said step of allowing said molten portion to move vertically comprises moving it downwardly.

7. A method for forming a lens at the end of an optical fiber comprising:

inserting said fiber through a longitudinal hole which extends through the length of an elongated contact, until a forward end portion of the fiber lies in a cross-aperture of the contact which extends between opposite sides of a forward end of the contact, and fixing the position of said fiber in said contact;

positioning said contact between a pair of electrodes whose tips are joined by an imaginary line which extends substantially horizontally, with the forward end portion of the fiber extending vertically and with said imaginary line lying at about the desired position of the tip of a lens to be formed on said fiber and the tip of the fiber lying a distance forward of said imaginary line about equal to the diameter of the fiber;

heating said fiber end portion including establishing an arc between said electrodes which initially melts a fiber location lying substantially along said imaginary line to cause a bulge at said fiber location, and continuing to heat said fiber until a lens forms whose center lies rearward of said imaginary line.

8. The method described in claim 7 wherein:

said electrodes have pointed tips and said step of heating includes heating said fiber until a lens forms whose tip lies substantially on said imaginary line.

* * * * *